July 1, 1958  F. W. LOEFFLER  2,841,232
EXHAUST MEANS EXTENDING THROUGH ACCESSIBLE ENCLOSURES
Filed Nov. 5, 1954  2 Sheets-Sheet 1
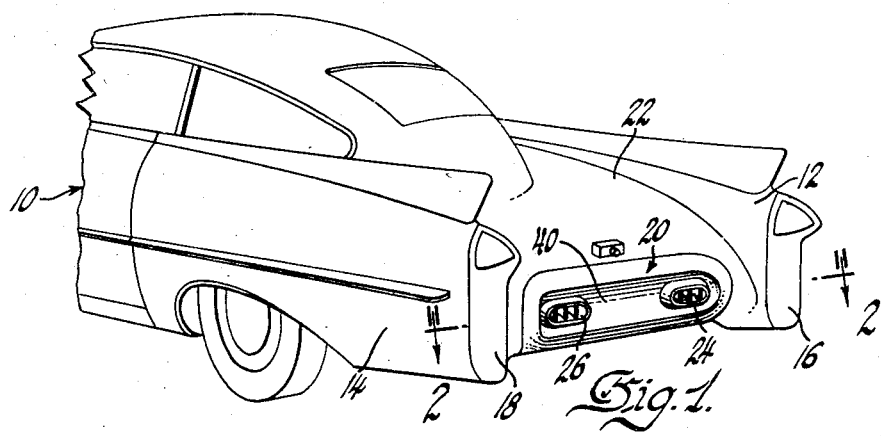
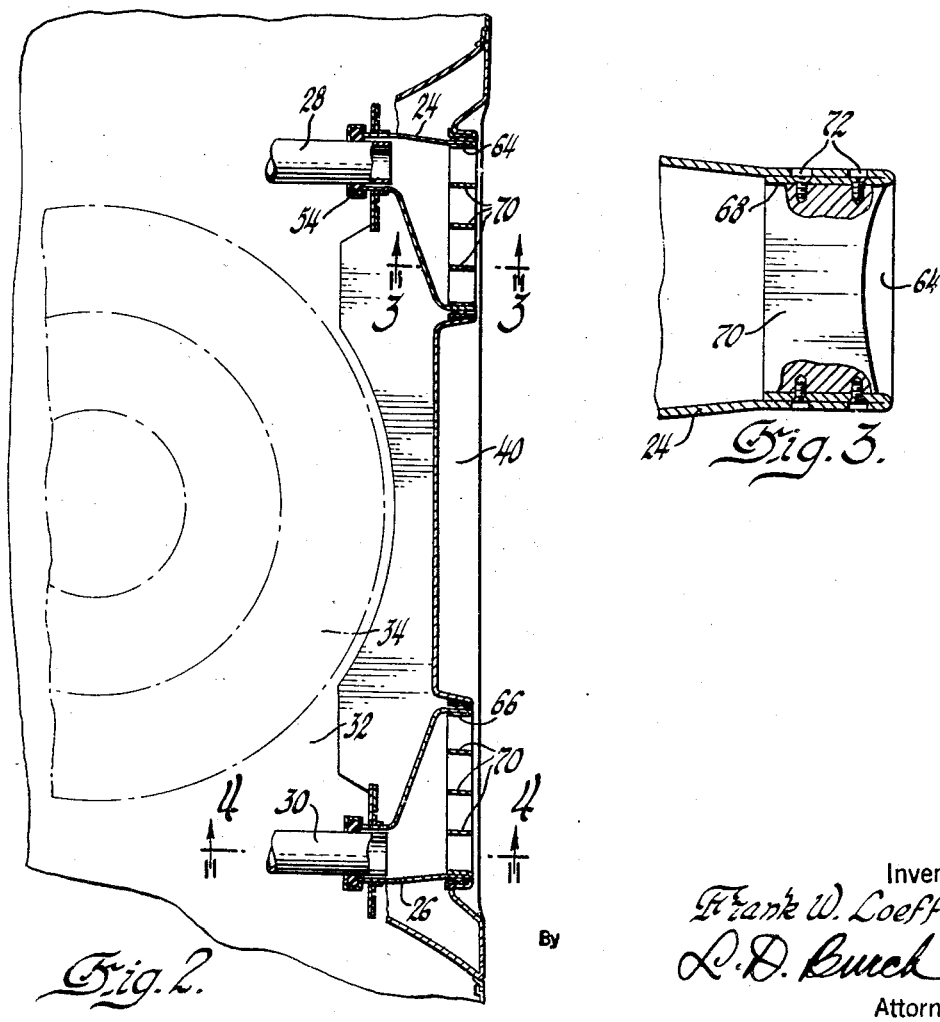
Inventor
Frank W. Loeffler
By L. D. Burch
Attorney

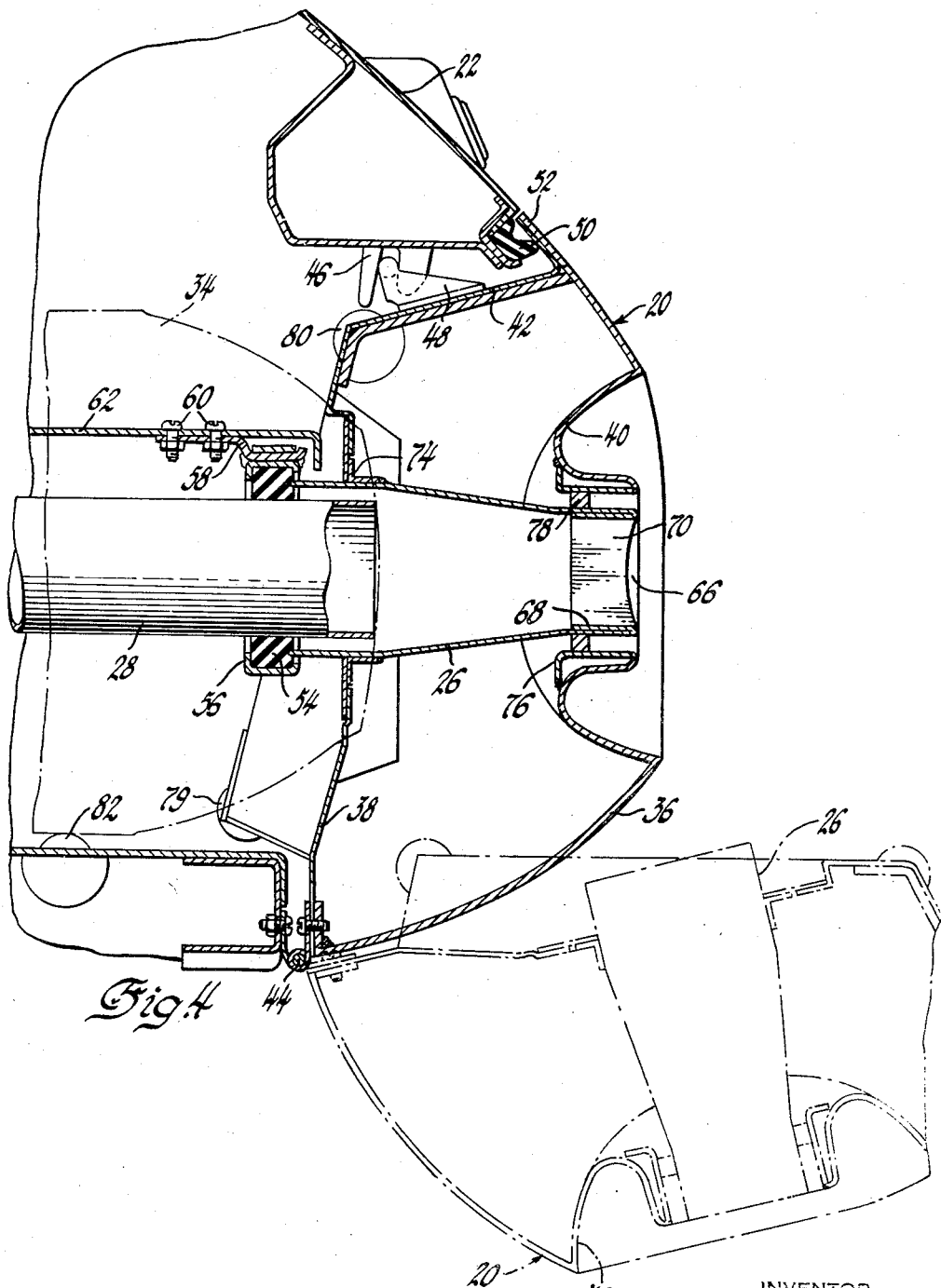

大专利office
2,841,232
Patented July 1, 1958

2,841,232

EXHAUST MEANS EXTENDING THROUGH ACCESSIBLE ENCLOSURES

Frank W. Loeffler, Detroit, Mich., assignor to General Motors Corporation, Detroit, Mich., a corporation of Delaware Application November 5, 1954, Serial No. 467,093

5 Claims. (Cl. 180—89)

This invention relates to engine exhaust means in general and more particularly to such means as used in automotive and other vehicles.

Engine exhaust means including exhaust conduits and tail pipes as used with automotive vehicles have heretofore extended rearwardly to protrude beneath the vehicle body at the rear end thereof. With the present trend towards lowering vehicle bodies, such exhaust conduits have, in some instances, been extended through the vehicle bumper members. Such disposition subjects the exhaust conduit to the impact forces received by the bumper members. It has not been considered advisable in the past to have the exhaust conduit extend through the side of the vehicle body near the back end thereof because of the necessary bends required to be formed in the conduit which consequently makes installation difficult, forms a back pressure within the conduits and for numerous other reasons. It has also not been considered practical to extend the exhaust conduits through the rear part of the vehicle body due to the loss of trunk space incident thereto.

It is now proposed to provide exhaust means which may be extended through the aftermost part of the vehicle body. Such exhaust means are disposed between vehicle bumper members rather than through such members and are positioned within the protection of the bumper members. It is proposed to provide through flow exhaust means which are connected to exhaust extension members provided within a spare tire compartment door. Such spare tire compartment is disposed under the normal trunk compartment of the vehicle and between the rearwardly extended exhaust conduits. It is proposed to provide means whereby the spare tire compartment door, including the exhaust extensions, may be hinged open to allow removal of the spare tire without interference with the exhaust conduits or extension members. The spare tire compartment door is of double walled thickness having the exhaust extension members formed therewithin and between. The extension members are telescoped about the ends of the conventional exhaust conduits which include sealing means to prevent the escape of exhaust gases other than through the extension members.

The proposed engine exhaust means as provided through the spare tire compartment door presents a practical solution to the disposition of exhaust conduits at the extreme rear of a vehicle body. At the same time, the exhaust means, as here provided, includes added utility to the spare tire compartment door while disposing the exhaust conduits in a protected location and providing a more pleasing general appearance.

In the drawings:

Figure 1 is a perspective view of the rear end of a vehicle having the present invention embodied therein.

Figure 2 is an enlarged cross-sectional top view of the exhaust means through a part of the vehicle shown in Figure 1 taken in the plane of line 2—2 and viewed in the direction of the arrows thereon.

Figure 3 is a cross-sectional view of the exhaust extension member as shown in Figure 2 taken in the plane of line 3—3 and viewed in the direction of the arrows thereon.

Figure 4 is an enlarged cross-sectional side view of the proposed exhaust means taken in the plane of line 4—4 of Figure 2 and viewed in the direction of the arrows thereon. The spare tire compartment door, as opened, is shown in phantom in Figure 4.

The vehicle 10 shown in Figure 1 includes rearwardly extended fenders 12 and 14 having bumper members 16 and 18 respectively secured thereto. Between and within the protection of the bumper members 16 and 18 is provided a spare tire compartment door 20 disposed within the rearmost lower extremity of the vehicle body 22. Such spare tire compartment door 20 includes exhaust conduit members 24 and 26.

Exhaust conduits or tail pipes 28 and 30, which are connected to the exhaust system of the engine of vehicle 10, extend rearwardly to terminate as shown in Figure 2. Between the exhaust conduits 28 and 30 is provided a spare tire compartment 32 housing a vehicle tire 34. The conduits 28 and 30 extend along the sides of the tire 34 but do not interfere therewith.

Referring to Figure 4 the spare tire compartment door 20 is shown to include spaced walls 36 and 38. The outer wall 36 is generally convex to conform with the contour of the vehicle body 22 except for the central portion thereof which includes a concave portion 40. The inner wall 38 of the compartment door 20 is secured to the lower end of the outer wall 36 and extends substantially vertically upward and then is bent forwardly as at 42 for securement to the upper end of wall 36. The spare tire compartment door 20 is hinged to the vehicle body 22 as at 44. Latch means 46 are provided in the vehicle body 22 over the door 20 for engagement with a cooperating latch member 48 secured upon portion 42 of inner wall 38. Weather sealing means 50 are secured to the vehicle body 22 about the edge of the spare tire compartment access and are engaged by lip 52 of the compartment door to seal against inclement weather conditions.

The exhaust conduit 28 is shown in Figure 4 as extended through a mounting ring 54 of resilient material disposed within a case member 56 secured to a bracket 58, which bracket is secured by fastening means 60 to a frame member, body support or such 62. Such mounting reduces the conduction of heat, transmission of noises, provides a flexible mounting and as hereafter described provides means of sealing against escaping exhaust gases.

Between the spaced walls 36 and 38 forming the spare tire compartment door 20 are secured exhaust conduit extension members 24 and 26. The innermost ends of extension members 24 and 26 extend through wall 38 and are adapted to telescope over the ends of exhaust conduits 28 and 30 and to engage and seal against the resilient mounting ring 54 when the compartment door 20 is closed. The outermost ends of extension members 24 and 26 are enlarged and flattened to form oblong horizontally disposed exhaust gas outlets 64 and 66. Such outlets 64 and 66 extend inwardly towards the center line of the vehicle and are disposed within opposite ends of the concave portion 40 of the outer wall 36 of the door 20. The ends of extension members 24 and 26 are rolled or formed backwards within their respective outlet openings 64 and 66 as at 68 to provide a more sturdy construction and pleasing appearance. A plurality of vertically disposed deflector or baffle plates 70 are secured by fastening means 72 or the like within the outermost flattened ends of extension members 24 and 26 to also provide added strength and further to properly direct exhaust gases flowing therethrough.

The extension members 24 and 26 are secured by welding or other means to the inner wall 38 of the spare tire compartment door 20. In the present instance, the members are secured to a flanged bracket 74 secured to such wall. The extension members extend rearwardly and have their outer ends disposed through outer wall 36 and in spaced relation thereto. The edges of wall 36 forming the openings through which the extension members 24 and 26 extend are reinforced by bracing means 76. Because of the great heat of the exhaust gases flowing through the exhaust conduits and to protect the exterior finish of the compartment door 20 from such heat, insulation or separator means 78 are disposed between the extension members and the bracing means 76.

The spare tire compartment door includes roller members 79 and 80 which are mounted within the inner wall 38 thereof in any suitable manner. Such roller members 79 and 80 in conjunction with other roller members as at 82 provided in the floor of the spare tire compartment provide greater ease in loading and unloading the vehicle tire 34. The disposition of such rollers with the door 20 open is shown in phantom in Figure 4.

It will be apparent that the exhaust conduits 28 and 30 lie well outboard of the tire 34 as disposed within its housing compartment 32. The extension members 24 and 26 with the spare tire compartment door 20 closed are engaged and sealed over such conduits. The outermost ends of the extension members 24 and 26 lie within the concave portion 40 of the spare tire door and are further disposed within the protection of the bumper members 16 and 18. When the spare tire compartment door 20 is opened, the extension members 24 and 26 clear the end of the conduits 28 and 30 without interference and provide suitable access to the spare tire 34.

I claim:

1. Exhaust means for use with automotive vehicles which include exhaust conduit means extended rearwardly of said vehicle, a compartment door provided within the rear end of said vehicle for access to an enclosure and disposed directly in the path of said conduit means, and exhaust conduit extension means provided through said door and aligned and engaged with said exhaust conduit means for conducting exhaust gases away therefrom, said extension means being disengaged from said exhaust conduit when said compartment door is opened.

2. Exhaust means for use with automotive vehicles which include exhaust conduits extending rearwardly of said vehicle on both sides thereof, a compartment door provided within the rear end of said vehicle and directly in the path of said conduits, a storage compartment provided between said exhaust conduits and closed by said compartment door, and exhaust conduit extension members mounted within said door and aligned with and engaged about said exhaust conduits, said extension members providing an escape means for exhaust gases flowing through said exhaust conduits and being disengaged from about said exhaust conduits when said compartment door is opened to provide access to said compartment.

3. Exhaust means for use with automotive vehicles having a compartment provided in the rear end thereof and including a compartment door for closing said compartment, said means including exhaust conduits extended rearwardly with respect to said vehicle and through said compartment, exhaust extension members mounted within said door and having ends disposed in alignment with said exhaust conduits, said extension members engaging said exhaust conduit when said door is closed to provide a passageway for the escape of exhaust gases therethrough, and said door being formed to provide a recessed portion within which the other ends of said extension members are disposed, said extension members thereby being generally protected against impact forces received at the rear of said vehicle.

4. Exhaust means for the passage of exhaust gases therethrough, said means including an exhaust conduit, means for resiliently mounting the end of said conduit to a structural member, said resilient mounting means providing for limited flexure of said conduit and the minimal transfer of heat and vibrational forces to said structural member, an exhaust extension member mounted within a removable member connected to said structural member, said extension member having one end disposed in spaced relation to said conduit and engaging said resilient mounting means to seal against the escape of exhaust gases therebetween, the other end of said extension member extending through said removable member and being disposed in spaced relation to the wall thereof through which extended, and insulation means disposed about said other end of said extension member to further insulate against the transmission of vibrational effects and the conduction of the heat of said exhaust gases to said structural member.

5. Exhaust means for vehicle use including exhaust conduit means extending through an enclosure requiring access thereto, access means removably secured within the end wall of said enclosure, said access means being in the path of the flow of exhaust gases from said conduit, and outlet means provided through said removable access means and disposed for sealing engagement with said conduit means for the escape of exhaust gases therethrough upon the closure of said enclosure by said access means.

References Cited in the file of this patent

UNITED STATES PATENTS

| | | |
|---|---|---|
| 1,110,040 | Chatain | Sept. 8, 1914 |
| 2,121,504 | Martin | June 21, 1938 |
| 2,254,491 | Olley | Sept. 2, 1941 |

FOREIGN PATENTS

| | | |
|---|---|---|
| 355,786 | Germany | July 2, 1922 |
| 449,223 | Italy | June 8, 1949 |
| (Corresponding U. S. 2,529,995, Nov. 14, 1950) | | |
| 203,292 | Switzerland | June 1, 1939 |